(12) United States Patent
Daghighian et al.

(10) Patent No.: US 10,547,340 B1
(45) Date of Patent: Jan. 28, 2020

(54) MOBILE PHONE CASE WITH AN INTEGRATED CHARGING AND DATA COMMUNICATION APPARATUS

(71) Applicants: Nicole Daghighian, Santa Monica, CA (US); Farhad Daghighian, Santa Monica, CA (US); Paul B. Thomas, San Pedro, CA (US)

(72) Inventors: Nicole Daghighian, Santa Monica, CA (US); Farhad Daghighian, Santa Monica, CA (US); Paul B. Thomas, San Pedro, CA (US)

(73) Assignee: U-Charge LLC, Santa Monica, CA (US)

( * ) Notice: Subject to any disclaimer, the term of this patent is extended or adjusted under 35 U.S.C. 154(b) by 229 days.

(21) Appl. No.: 15/627,453

(22) Filed: Jun. 20, 2017

(51) Int. Cl.
| | |
|---|---|
| *H04M 1/00* | (2006.01) |
| *H04B 1/3888* | (2015.01) |
| *H04M 1/02* | (2006.01) |
| *H04M 1/21* | (2006.01) |
| *H04B 1/3883* | (2015.01) |
| *H02J 7/00* | (2006.01) |

(52) U.S. Cl.
CPC .......... *H04B 1/3888* (2013.01); *H02J 7/0045* (2013.01); *H02J 7/0052* (2013.01); *H04B 1/3883* (2013.01); *H04M 1/0249* (2013.01); *H04M 1/0274* (2013.01); *H04M 1/21* (2013.01); *H02J 2007/0062* (2013.01)

(58) Field of Classification Search
CPC ... H04B 1/3888; H04B 1/3883; H02J 7/0052; H02J 7/0045; H02J 2007/0062; H04M 1/0274; H04M 1/21

USPC .......... 455/573, 575.1, 343.1, 572
See application file for complete search history.

(56) References Cited

U.S. PATENT DOCUMENTS

| | | | | |
|---|---|---|---|---|
| 9,544,005 B2 * | 1/2017 | Wei | ...................... | H04B 1/3883 |
| 9,774,192 B2 * | 9/2017 | Wojcik | ................ | H05K 5/0086 |
| 10,057,395 B1 * | 8/2018 | Wagstaff | ............. | H04M 1/0274 |
| 2014/0035511 A1 * | 2/2014 | Ferber | ................... | H02J 7/0042 |
| | | | | 320/103 |
| 2014/0192481 A1 * | 7/2014 | Wojcik | ................ | H05K 5/0086 |
| | | | | 361/679.55 |
| 2014/0192492 A1 * | 7/2014 | Wojcik | ................ | H05K 5/0086 |
| | | | | 361/752 |
| 2014/0195180 A1 * | 7/2014 | Wojcik | ................ | H05K 5/0086 |
| | | | | 702/63 |

(Continued)

*Primary Examiner* — Sonny Trinh
(74) *Attorney, Agent, or Firm* — Jerry Fong

(57) ABSTRACT

A mobile phone case includes an integrated charging and data communication apparatus, thereby forgoing the need to carry a separate charging and communication cable. The mobile phone case further includes an integrated cable storage compartment for storing the charging and data communication apparatus. The charging and communication apparatus includes a circuit board for electrically connecting a USB connector and a Lightning connector. A first flat cable has one end connected to the USB connector and the other end connect to the circuit board. A second flat cable has one end connected to the Lightning connector and the other end connected to the circuit board to provide electrically connection between the USB connector and the Lightning connector. The storage compartment further includes a USB side slot, a Lightning bottom slot, and a lid for opening and closing the storage compartment.

27 Claims, 12 Drawing Sheets

(56) References Cited

U.S. PATENT DOCUMENTS

| | | | | |
|---|---|---|---|---|
| 2016/0042202 A1* | 2/2016 | Murray | ................... | G06F 1/203 |
| | | | | 320/108 |
| 2016/0118861 A1* | 4/2016 | Gabriel | ................ | H02K 7/1861 |
| | | | | 320/114 |
| 2016/0308569 A1* | 10/2016 | Wei | ...................... | H04B 1/3883 |

* cited by examiner

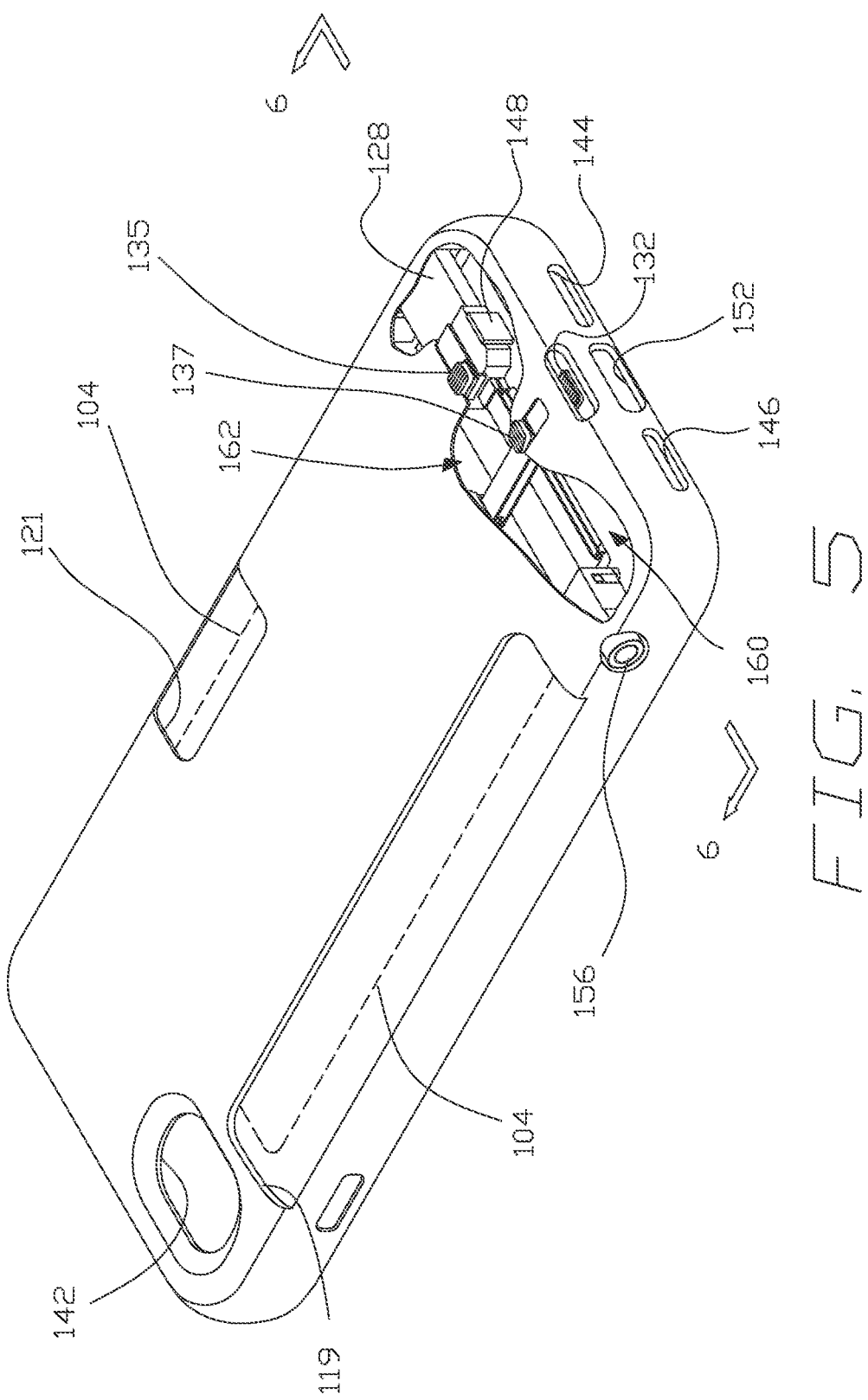

MOBILE PHONE CASE WITH AN INTEGRATED CHARGING AND DATA COMMUNICATION APPARATUS

BACKGROUND OF THE INVENTION

1. Field of the Invention

The present invention generally relates to the field of mobile phone cases. More particularly, the present invention relates to a charging and data communication apparatus integrated to a mobile phone case.

2. Description of the Prior Art

Mobile devices, such as smartphones and cell phones, have become very popular and widely used for communication and quick access to information and through various applications including social networks. Increased use of mobile devices means increased power consumption. Thus, maintaining a charged state of a mobile device has become an increasing problem.

Generally, charging will require access to a 110 VAC. There are AC to DC converters that provide 5 VDC to a USB connector, and then an intermediary cable is needed with one end having a USB plug and the other end having a Lightning™ plug that goes into the mobile phone. Often, the users have access to a 5 DC voltage of a USB receptacle and the intermediary charging device and a charging and data communication cable. Sometimes the operator of a mobile device is in an emergency situation that although he or she has a charging device, such as the USB plug of a computer or car, but lacks the charging and data communication cable needed to initiate charging and communication. This may be because he or she has forgotten to carry with them the cable, or separately carrying around a charging cable was not convenient.

Mobile device cases are available on the market but lack an integrated charging and communication cable.

Therefore, to solve the problem of a charging and data communication cable being lost or unavailable when needed, and facilitate a convenient way of connecting the cable for charging the mobile device, there is a need for a mobile phone case with an integrated storage compartment to store a charging cable and also allows the connectors of the charging cable to protrude outwardly from the mobile phone case to plug into a mobile device and a 5 DC voltage charging device to charge the battery of the mobile device. The mobile phone case may further solve the problem of providing an additional storage compartment for carrying personal items such money, credit cards and identification along with the charging and data communication cable.

It is even more desirable if the AC to DC converter is also available as an integral part of a mobile phone case, together with charging cable.

SUMMARY OF THE INVENTION

In the preferred embodiment, the present invention mobile phone case includes an integrated charging and data communication apparatus, thereby forgoing the need to carry a separate charging and communication cable. The present invention is applicable to any portable electronic device such as a smartphone which has a power input port for charging a battery of the smartphone using a 5 voltage DC supply power.

The foregoing needs are met, to a great extent, by the present invention, wherein aspects of the present invention, enhancements are provided to the existing model of phone cases for mobile phones.

This novel phone case eliminates any need to remember to carry a charging and data communication cable. The mobile phone case allows not only carrying and protecting a mobile phone, but can also includes an integrated charging and data communication cable, and its connectors.

It is an object of the present invention to provide a mobile phone case which includes an integrated storage compartment to retain an integrated charging and data communication apparatus for charging a mobile phone.

It is also an object of the present invention to provide a mobile phone case with an integrated charging and data communication apparatus which is configured to extend from a stored configuration to a fully extended position for connecting a power connection port of a mobile phone and a low DC voltage power supply, and retractable when not in use into a stored configuration within the mobile phone case.

It is an additional object of the present invention to provide a mobile phone case which includes a circuit board for electrically connecting a pair of connectors from an integrated charging and data communication apparatus.

It is another object of the present invention to provide a mobile phone case which can provide access to all buttons, input/output ports, and functions of the mobile phone or mobile device, which is secured into the mobile phone case.

It is another object of the present invention to provide a mobile phone case which utilizes a linear spring-loaded mechanism for extending and retracting a charging and data communication cable from the mobile phone case so that it can be connected to a phone connection port of a mobile phone and a low DC voltage AC/DC power supply that may or may not be an integral part of this cable.

It is another object of the present invention to provide a mobile phone case which utilizes a zigzag or accordion type charging and data communication cable for connecting to a phone connection port of a mobile device and a low DC AC/DC voltage power supply.

It is a further object of the present invention to provide a leather or plastic wallet case which includes a mobile phone case and a storage compartment for retaining a charging and data communication cable such that the cable's connectors can connect to a phone connection port of a mobile device within the mobile phone case and a low DC voltage power supply.

In this respect, before explaining at least one embodiment of the present invention in detail, it is to be understood that the present invention is not limited in its application to the details of construction and to the arrangements of the components set forth in the following description or illustrated in the drawings. The present invention is capable of embodiments in addition to those described and of being practiced and carried out in various ways. In addition, it is to be understood that the phraseology and terminology employed herein, as well as the abstract, are for the purpose of description and should not be regarded as limiting.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 5 is a partial cut-out rear perspective view of a mobile phone case with an integrated charging and data communication apparatus, showing the apparatus in a stored configuration in accordance with another embodiment of the present invention;

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

In a related embodiment, the present invention mobile phone case 10 can be configured for use with an Apple iPhone™, for example an iPhone 7, such that an integrated storage compartment 16 can house an original Apple Lightning™ phone connection cable or USB 2.0 A Male to Micro-USB B cable that is modified to be used with the present invention. The present invention is not limited to the connectors mentioned above but may be configured with other types of connectors known within the electronic industry.

Figure 1:
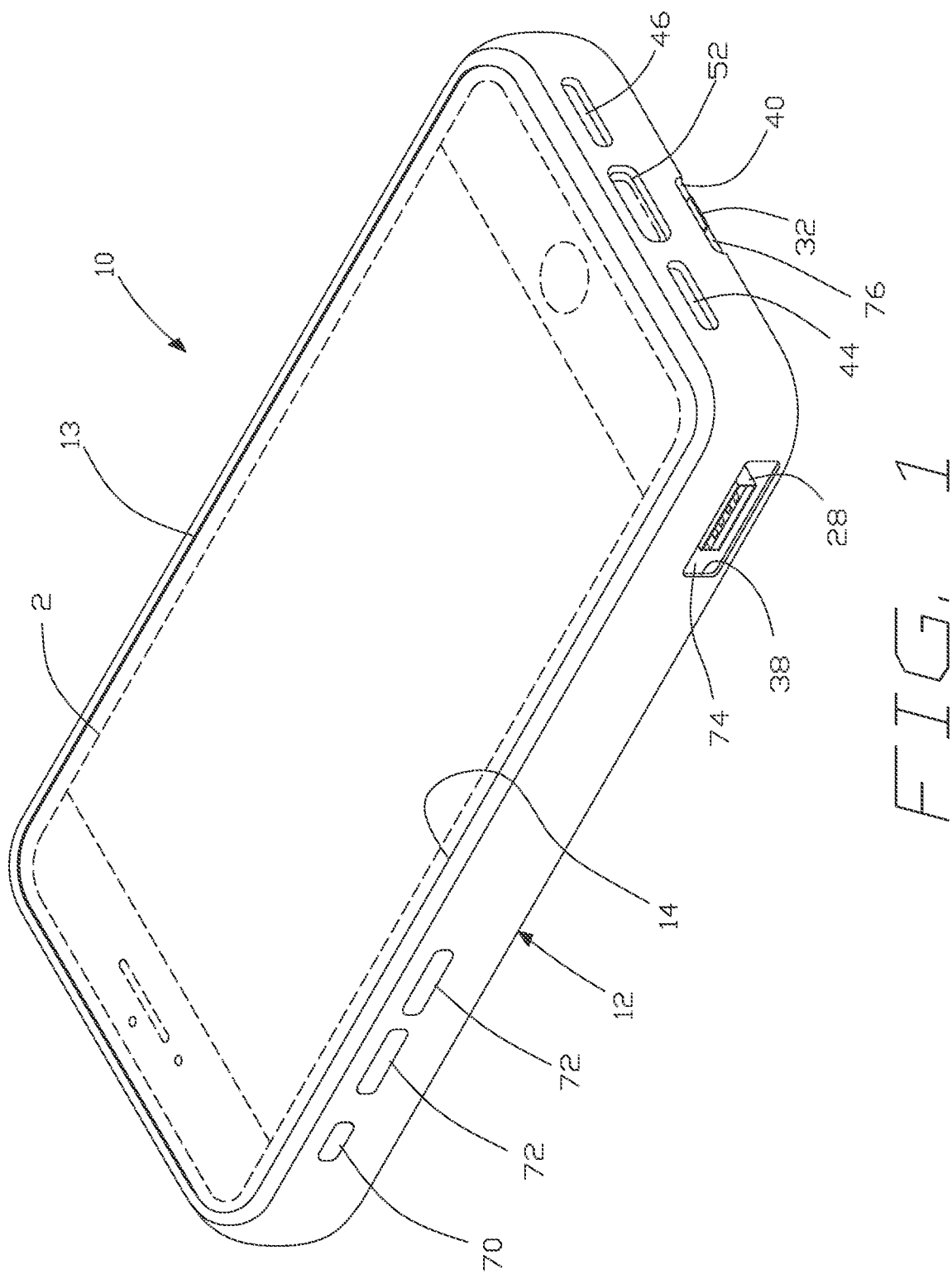
FIG. 1 is a front perspective view of a mobile phone case with an integrated charging and data communication apparatus in accordance with an embodiment of the present invention.

Referring to FIG. 1, there is shown a front perspective view of the present invention mobile phone case 10 which includes a main body 12 and a phone cavity 14 located on a front side 13 of the main body 12 wherein the phone cavity 14 is configured to retain a mobile phone 2.

Figure 2:
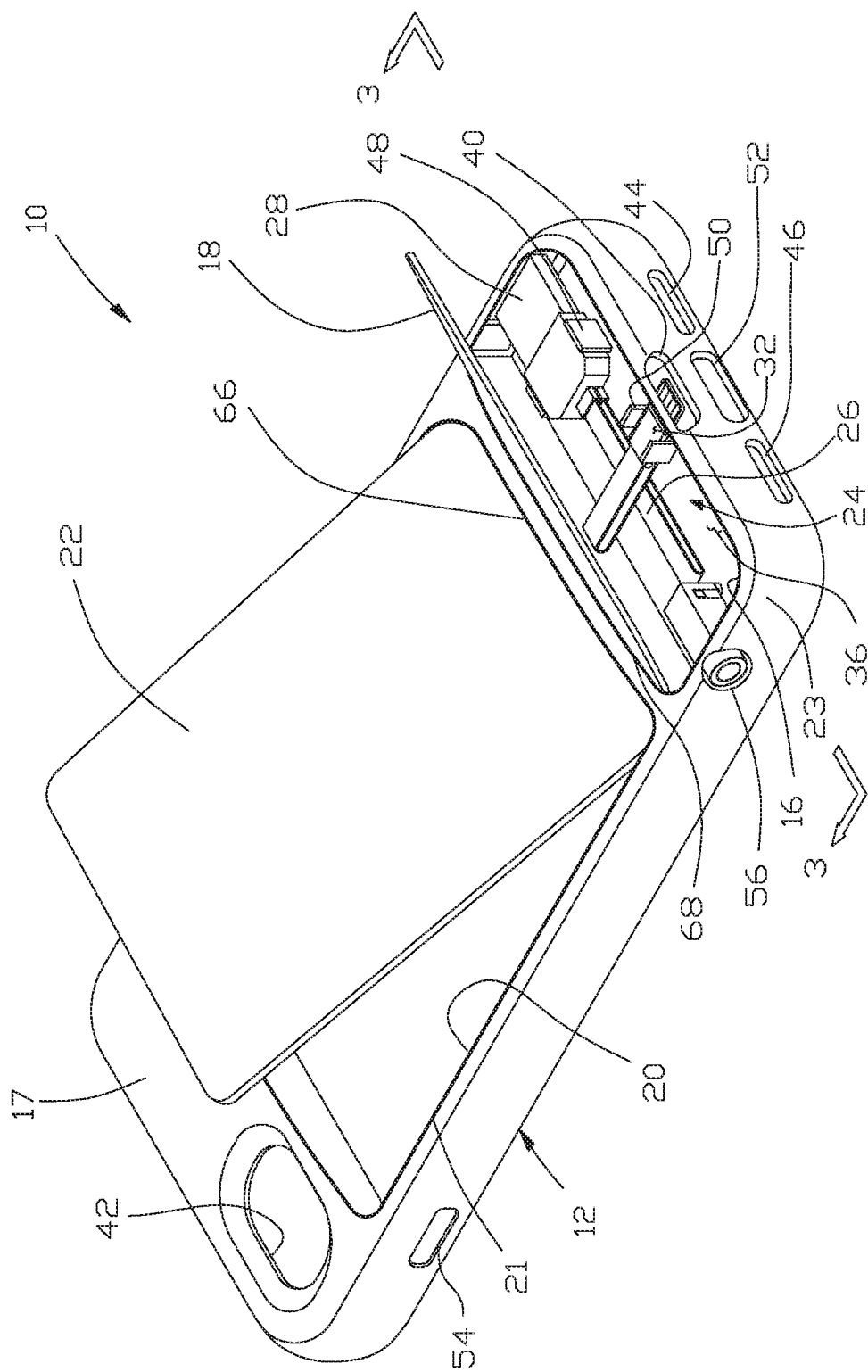
FIG. 2 is a rear perspective view of a mobile phone case with an integrated charging and data communication apparatus, showing the apparatus in a stored configuration in accordance with an embodiment of the present invention.

Referring to FIG. 2, there is shown a rear perspective view of the present invention mobile phone case 10 which further includes an upper integrated card storage compartment 20 and a lower integrated cable storage compartment 16. The integrated card storage compartment 20 is located on a rear side 17 of the main body 12 at an upper portion 21 for retaining a plurality of credit cards and etc. An elongated lid 22 is securely attached to the main body 12 at its proximal end 66 to enclose the card storage compartment 20. By lifting the lid 22 up, access is gained to the card storage compartment 20 for accessing the plurality of credit cards therein.

Figure 3:
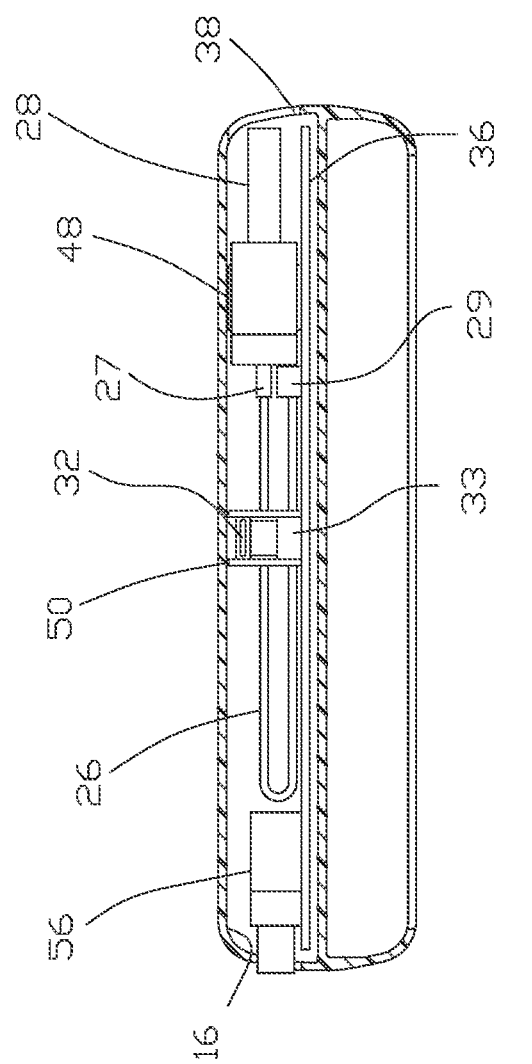
FIG. 3 is a cross-sectional view taken along lines 3-3 of FIG. 2.

Referring to FIGS. 2 and 3, the integrated cable storage compartment 16 is located on the rear side 17 of the main body 12 at a lower portion 23 for retaining an integrated charging and data communication apparatus 24. The charging and communication apparatus 24 includes a circuit board 36, a USB connector 28, and a Lightning connector 32 wherein the circuit board 36 is electrically connected to the USB connector 28 and the Lightning connector 32. A first flat cable 26 has one end 27 connected to the USB connector 28 and the other end 29 connect to the circuit board 36. A second flat cable 30 has one end 31 connected to the Lightning connector 32 and the other end 33 connected to the circuit board 36 to provide electrical connection between the USB connector 28 and the Lightning connector 32.

The storage compartment 16 further includes a USB side slot 38, a Lightning bottom slot 40, and a lid 18 for opening and closing the storage compartment 16. Both of the slots 38 and 40 may be covered by press-fitted covers 74 and 76 respectively to prevent damage to the connectors and provide a sleek look for the mobile phone case 10. The lid 18 is securely attached to the main body 12 at its proximal end 68.

By lifting up the lid 18, access is gained to the storage compartment 16 where the integrated charging and data communication apparatus 24 is located. The user pushes forward the USB connector 28 through the USB side slot 38 for connecting to a port of a low DC voltage power supply. The USB connector 28 can be retracted when not in use by the user pushing the USB connector 28 back into position within the storage compartment 16 and securely retained by a retaining bracket 48. The user pushes forward the Lightning connector 32 in the same manner as the USB connector 28 but through the Lightning bottom slot 40 and rotatable for connecting to a charging and communication port of the mobile phone 2. The Lightning connector 32 is retracted when not in use by the user pushing the Lightning connector 32 back into the storage compartment 16 and secured by a retaining bracket 50.

What is unique about the cables is that it has an initial memory of its storage configuration within the storage compartment 16 so that the cables will not be tangled.

In a related embodiment, the Lightning connector 32 can be a female micro-B connector or other types of female/receptacle connectors for charging and data communication.

Figure 4:
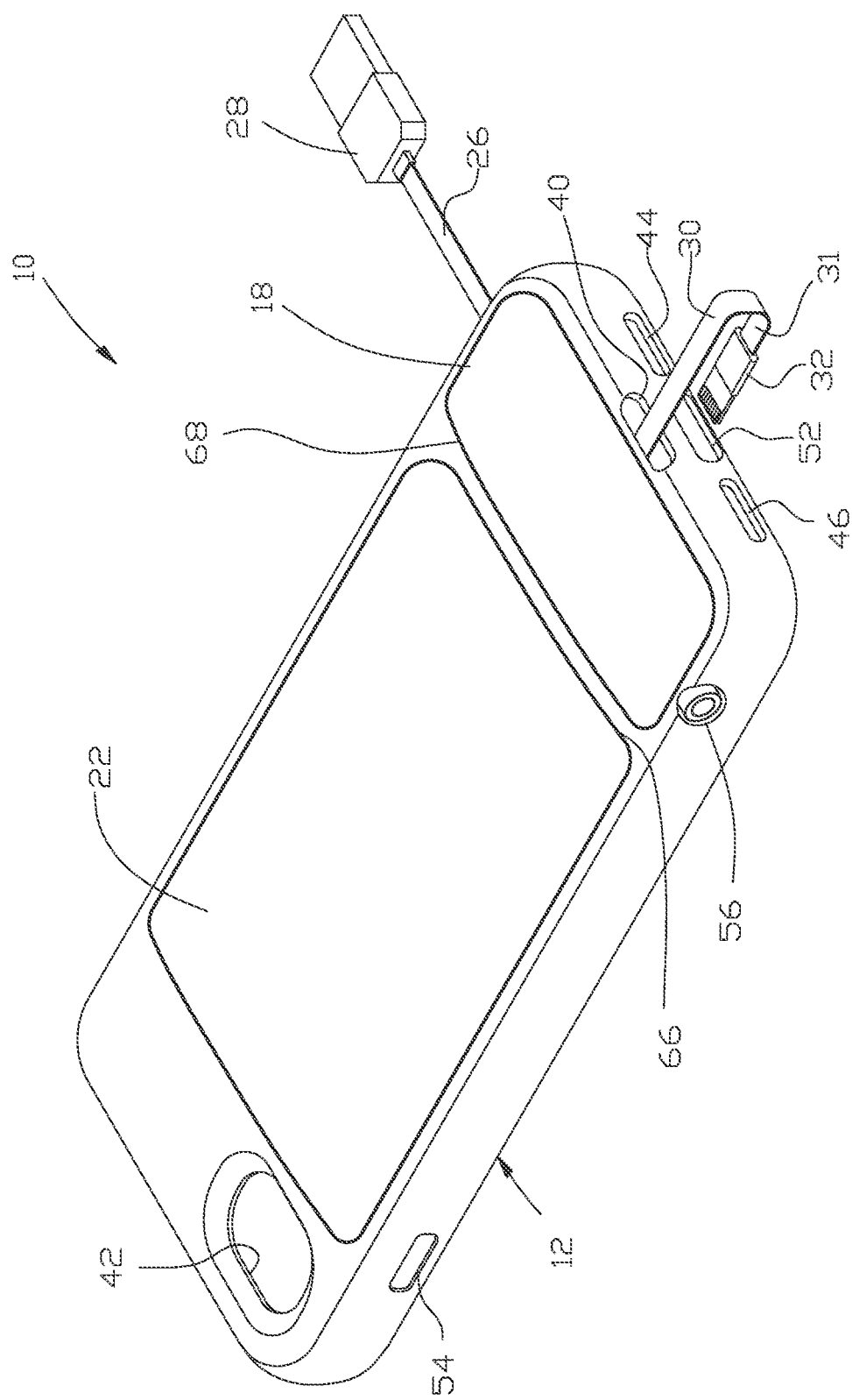
FIG. 4 is a rear perspective view of a mobile phone case with an integrated charging and communication apparatus, showing the apparatus in a fully extended position outside of the storage compartment in accordance with an embodiment of the present invention.

Referring to FIGS. 2, 3, and 4, there is shown a headphone auxiliary input 56 which is mounted on the circuit board 36 and electrically connected to the Lightning connector 32 for providing wired headphones connection when the Lightning connector 32 is connected to the mobile phone 2 for audio hands free operation. The headphone auxiliary input 56 may be a 3.5 mm headphone auxiliary input.

What is unique about the present invention mobile phone case 10 is that only the connectors 28 and 32 are fully extended out from the storage compartment 16 in order for someone to use the charging and data communication apparatus 24 of the present invention.

Referring to FIGS. 1 through 4, the mobile phone case 10 has a rear camera opening 42 which is an opening in the rear side 17 of the mobile phone case 10, configured to allow use of a rear camera and flash on the mobile phone 2 that is installed in the phone cavity 14 of the mobile phone case 10. The mobile phone case 10 includes a ring/silent opening 70, volume control openings 72, and a case screen on/off button 54 which is configured to press on a phone screen on/off button on the mobile phone 2 that is installed within the phone cavity 14 of the phone case 10. The mobile phone case 10 further includes a charging and communication port opening 52 for accessing a Lightning port of the mobile phone 2, and speaker openings 44 and 46.

Referring to FIGS. 5, 6A, 6B, and 7, there is shown an alternative embodiment of the present invention mobile phone case 110 which includes a main body 112 and a phone cavity 114 located on a front side 113 of the main body 112 wherein the phone cavity 114 is configured to retain the mobile phone as shown in FIG. 1.

The mobile phone case 110 further includes an upper integrated card storage compartment 120 and a lower integrated cable storage compartment 116. The integrated card storage compartment 120 retains a plurality of credit cards 104 and located on a rear side 117 of the main body 112 at an upper portion 121. The storage compartment 120 has a side opening 119 for sliding the plurality of credit cards 104 in and out of the storage compartment 120, and an opposite finger side opening 125 for pushing out the plurality of credit cards 104 from the storage compartment 120.

Figure 6A:
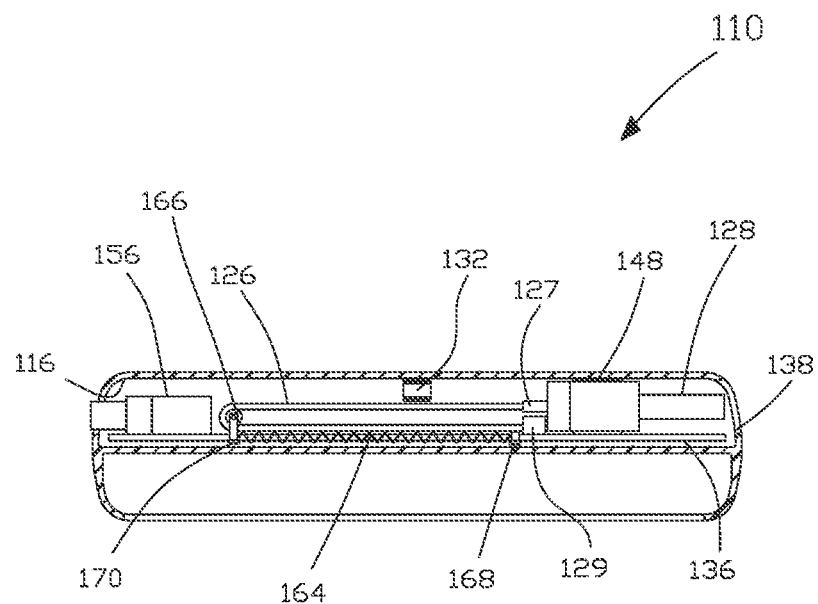
FIG. 6A is a cross-sectional view taken along lines 6-6 of FIG. 5, showing a spring in an uncompressed configuration.
Figure 6B:
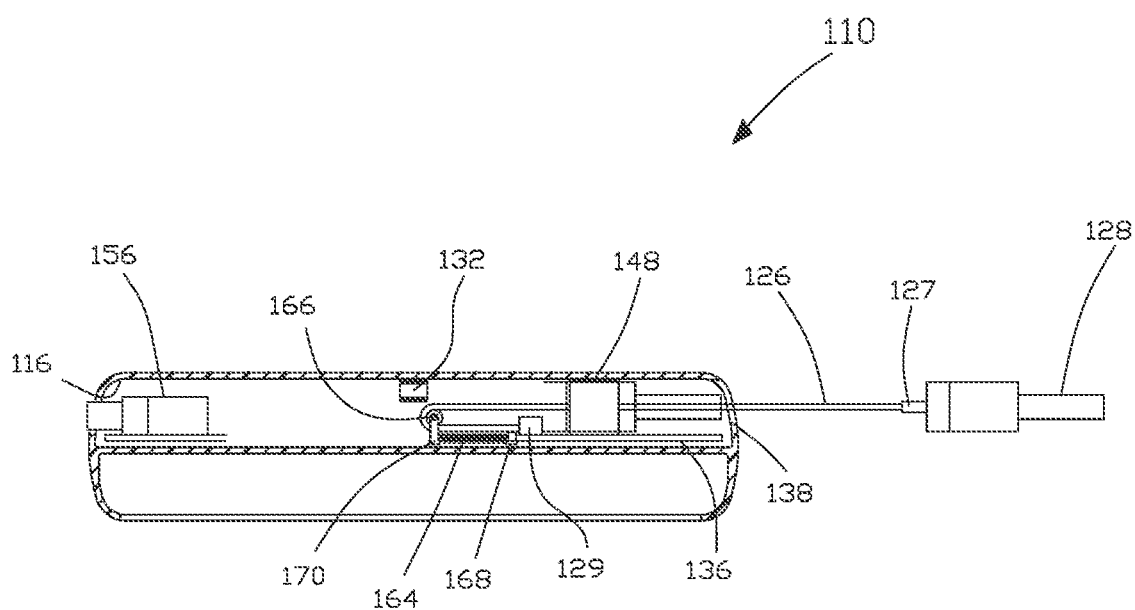
FIG. 6B is a cross-sectional view showing a spring in a compressed configuration.

Referring to FIGS. 5, 6A, and 6B, there is shown the integrated cable storage compartment 116 which is located on the rear side 117 of the main body 112 at a lower portion 123 for retaining an integrated charging and data communication apparatus 124. The charging and communication apparatus 124 includes a circuit board 136, a USB connector 128, and a Lightning connector 132 where the circuit board 136 electrically connects the two connectors 128 and 132.

A first spring-loaded mechanism 160 includes a first flat cable 126 which has one end 127 connected to the USB connector 128 and the other end 129 connected to the circuit board 136, a pulley 168 for supporting the first flat cable 126 in a linear movement, a slidable shaft 170 for retaining the pulley 168, and a fixed post 168 permanently fixed and adjacent to the other end 129 of the USB connector 128. A second spring-loaded mechanism 162 includes a second flat cable 130 which has one end 131 connected to the Lightning connector 132 and the other end 133 connected to the circuit board 136 to provide electrical connection between the USB connector 128 and the Lightning connector 132. The second spring-loaded mechanism 162 also includes a pulley, a slidable shaft, and a fixed post which are designed and functioned the same way as the first spring-loaded mechanism 160, their description will not be described. The storage compartment 116 further includes a USB side slot 138 and a Lightning bottom slot 140.

Figure 7:
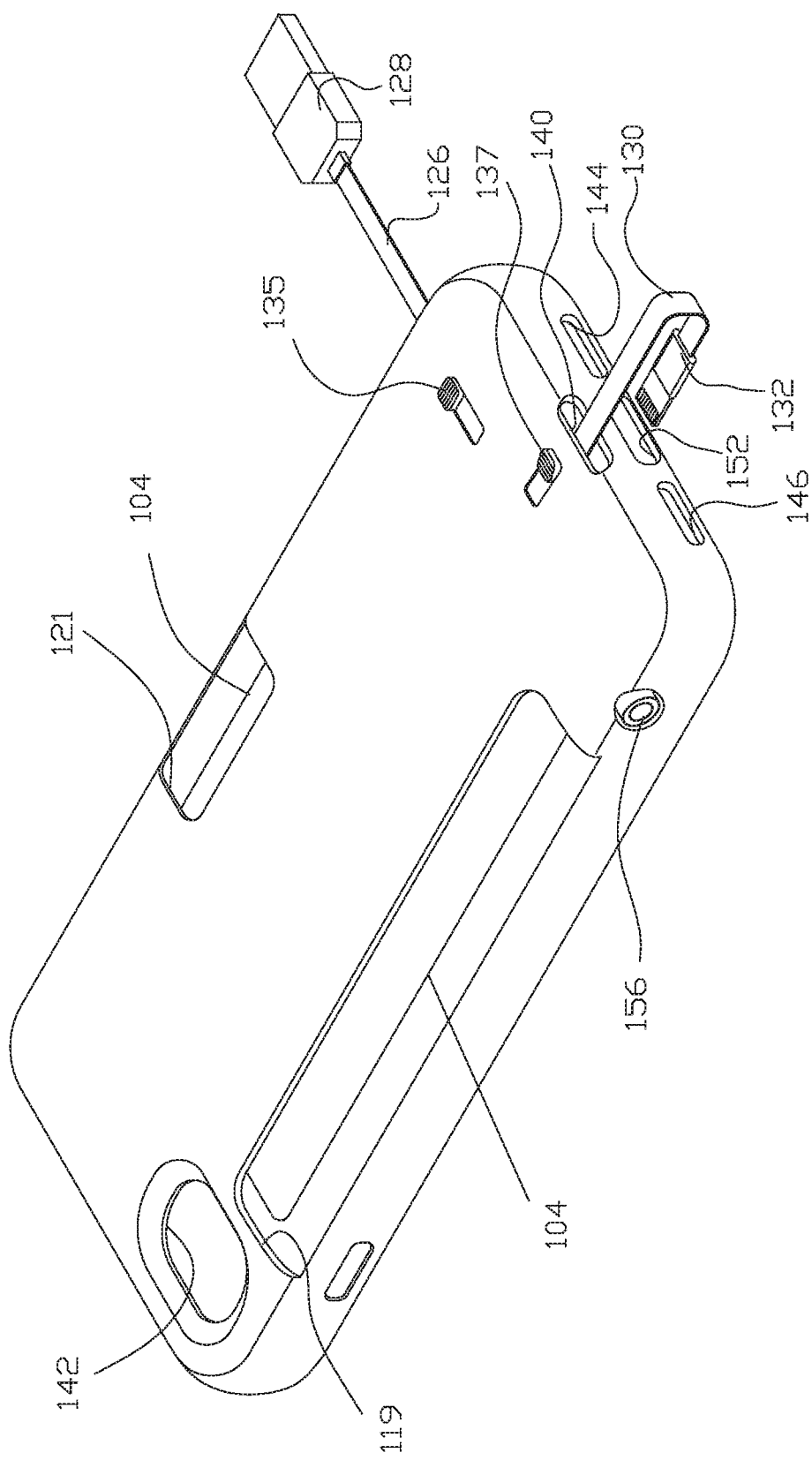
FIG. 7 is a rear perspective view of a mobile phone case with an integrated charging and data communication apparatus, showing the apparatus in a fully extended position outside of the storage compartment in accordance with another embodiment of the present invention.

Referring to FIG. 7, there is shown a pair of protruding pegs 135 and 137 which extend out from the storage compartment 116 for facilitating the movement of and coupling to the USB connector 128 and the Lightning connector 132 respectively. The pair of protruding pegs 135 and 137 are utilized to push the USB connector 128 and the Lightning connector 132 from a stored configuration within the storage compartment 116 to a fully extended position outside of the storage compartment 116 through the side slot 138 and the bottom slot 140 respectively and for respectively connecting to a port of a low DC voltage power supply and a port of the mobile device.

Both connectors 128 and 132 can be retracted when not in use by the user pushing the connectors 128 and 132 back into the storage compartment 116 and secured by retaining brackets 148 and 150. As the cable 126 and the connector 128 are extended, the spring 164 is compressed (see FIG. 6B) and as the cable 126 and connector 128 are retracted, the spring 164 is uncompressed (see FIG. 6A) allowing the cable 126 and the connector 128 to be spring back into the compartment 116. The compressed spring 164 assists with retraction the cable and connector. This extension and retraction means of the cable 130 and the connector 132 works the same way as the cable 126 and the connector 128.

In a related embodiment, the Lightning connector 132 can be a female micro-B connector or other types of female/receptacle connectors for charging and data communication.

Referring to FIGS. 5 through 7, there is shown a headphone audio jack 156 which is mounted on the circuit board 136 and connected to the Lightning connector 132 for providing wired headphones connection when the Lightning connector 132 is connected to the mobile phone for audio hands free operation. The headphone audio jack 156 may be a 3.5 mm headphone jack.

Referring to FIGS. 5, 6A, and 6B, there is shown the pair of retaining brackets 148 and 150 which are located and mounted on the circuit board 136 within the storage compartment 116 for respectively securing the USB connector 128 and the Lightning connector 132 in the stored configuration as shown in FIG. 5.

What is unique about the present invention mobile phone case 110 is that only the connectors 128 and 132 are fully extended out from the storage compartment 116 in order for someone to use the charging and data communication apparatus 124 of the present invention.

The mobile phone case 110 has a rear camera opening 142 which is an opening in the rear side 117 of the mobile phone case 110, configured to allow use of a rear camera and flash on the mobile phone that is installed in the phone cavity of the mobile phone case 110. The mobile phone case 110 includes a ring/silent opening (shown in FIG. 1), volume control openings (shown in FIG. 1), and a case screen on/off button 154 which is configured to press on a phone screen on/off button on the mobile phone that is installed within the phone cavity of the phone case 110. The mobile phone case 110 further includes a charging and communication port opening 152 for accessing a Lightning port of the mobile phone, and speaker openings 144 and 146.

Figure 8:
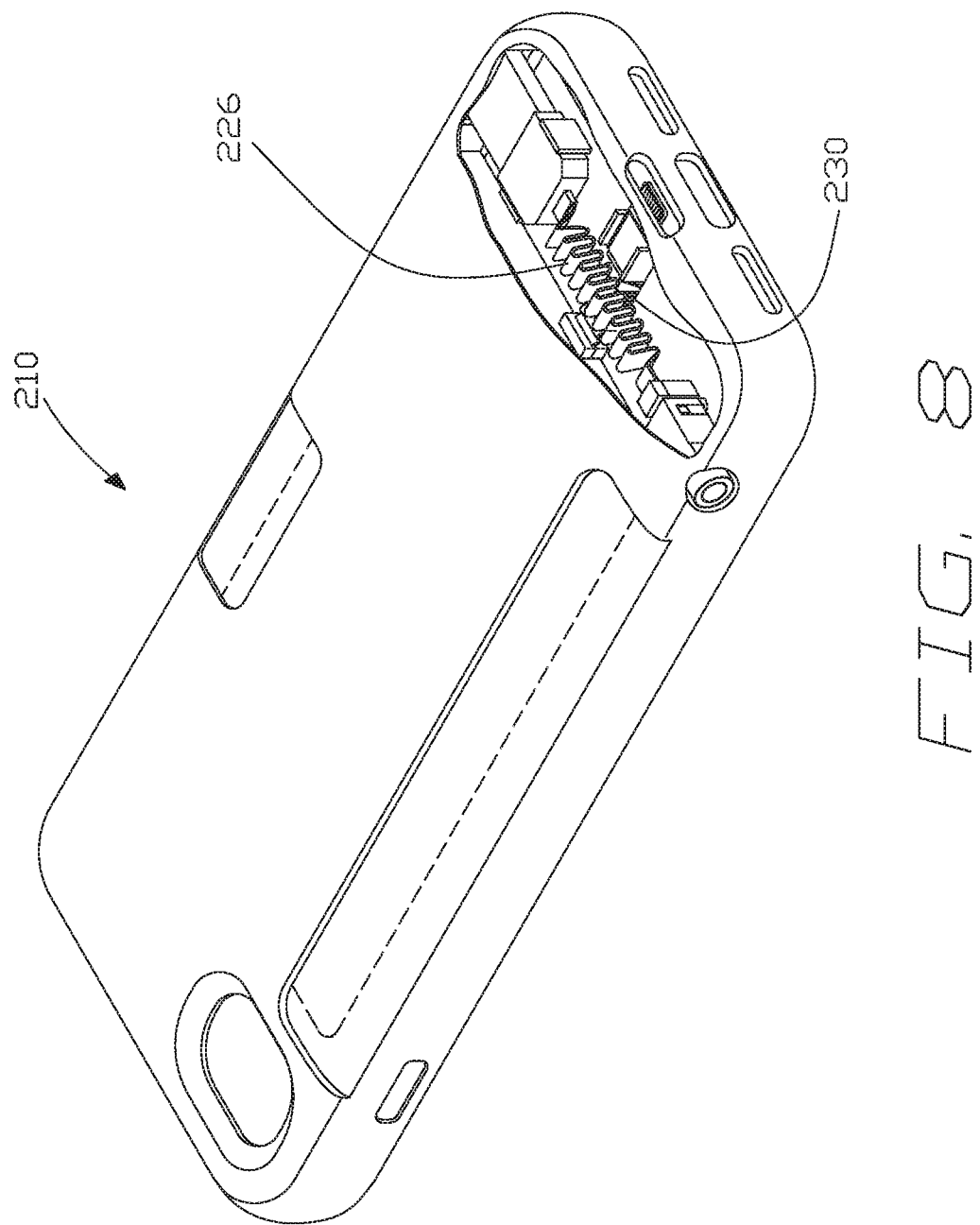
FIG. 8 is a partial cut-out rear perspective view of a mobile phone case with an integrated charging and communication apparatus, showing the connectors of the apparatus in a stored configuration in accordance with another embodiment of the present invention.
Figure 9:
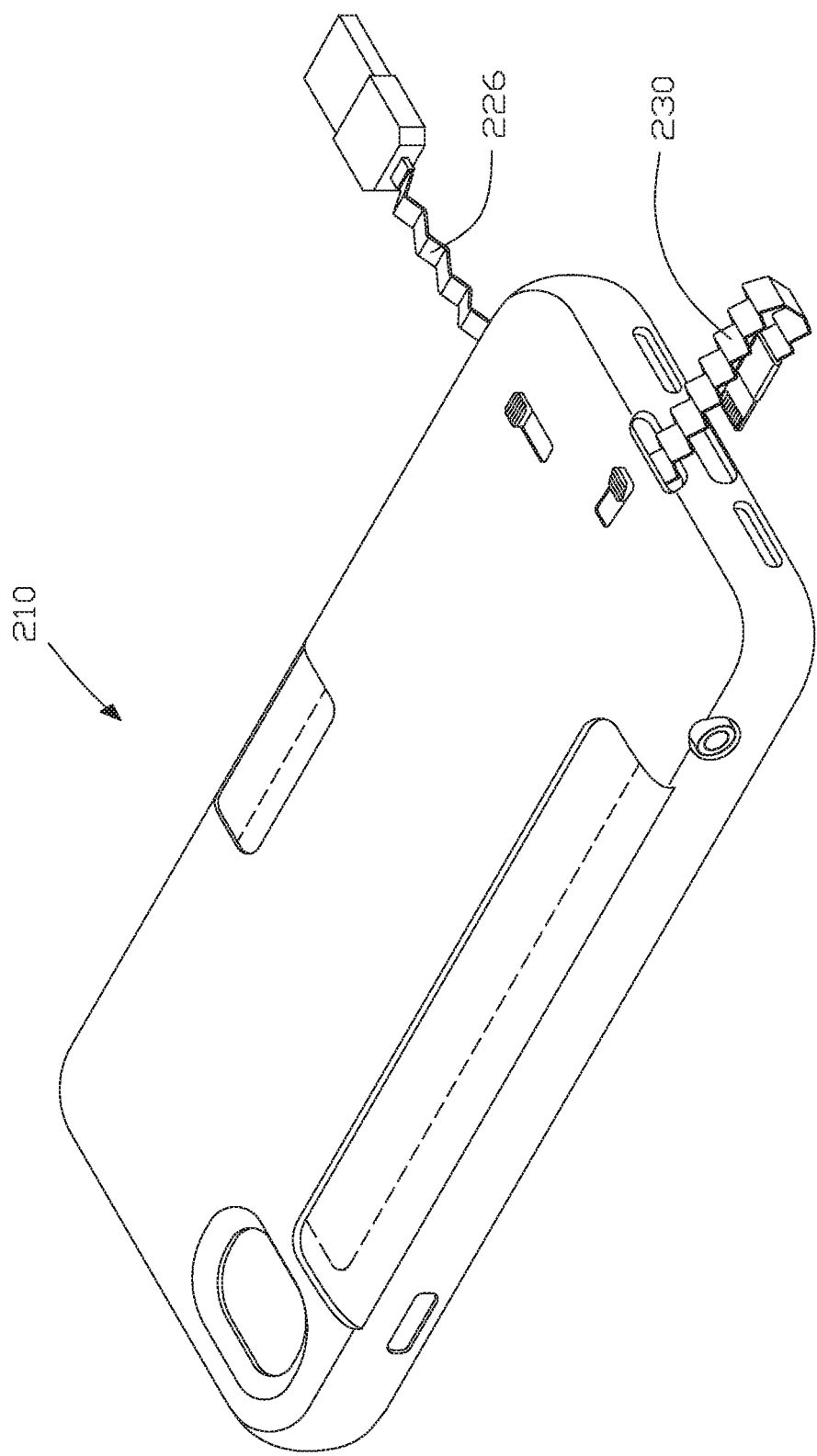
FIG. 9 is a rear perspective view of a mobile phone case with an integrated charging and data communication apparatus, showing the apparatus in a fully extended position outside of the storage compartment in accordance with another embodiment of the present invention.

Referring to FIGS. 8 and 9, there is shown another alternative embodiment of the present invention mobile phone case 210. This embodiment is very similar to the embodiment shown in FIGS. 5 through 7 except that first and second cables 226 and 230 are zigzag or accordion type cables.

Figure 10:
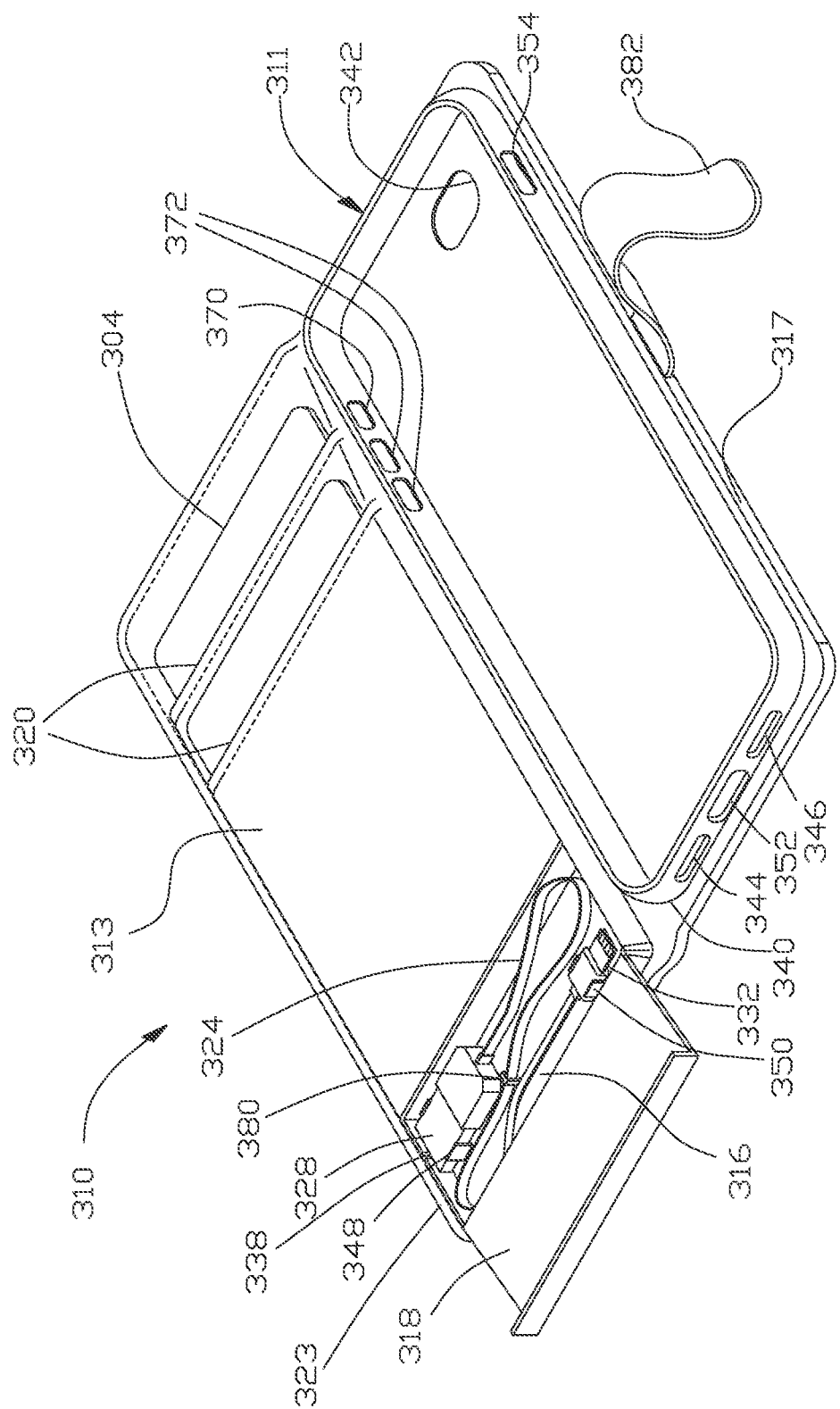
FIG. 10 is a perspective view of a wallet case with a storage compartment and a mobile device case, showing a charging and data communication cable in a stored configuration in accordance with another embodiment of the present invention.
Figure 11:
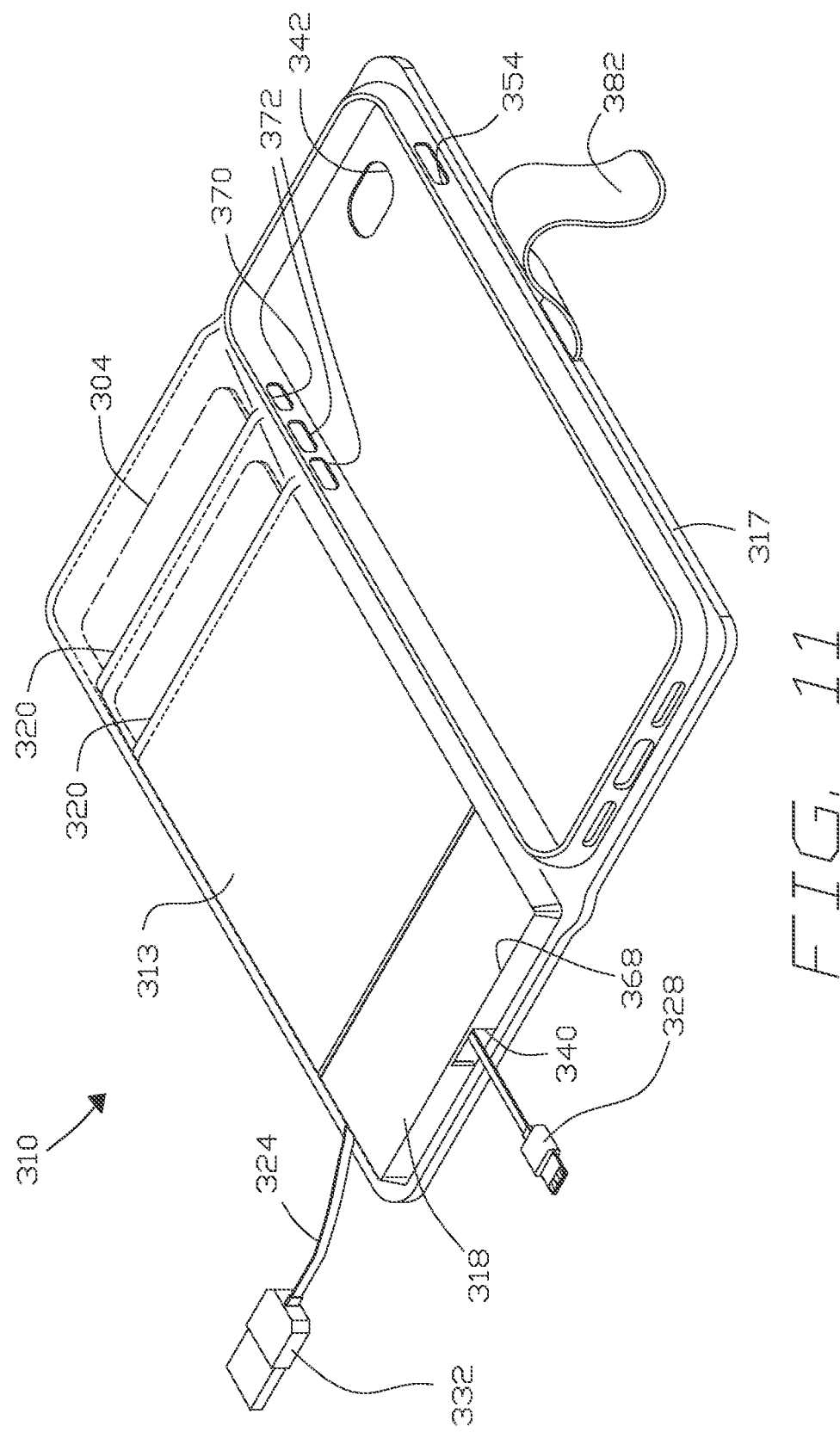
FIG. 11 is a perspective view of a wallet case with a storage compartment and a mobile device case, showing a charging and data communication cable and its connectors in a fully extended configuration and ready to be connected to a port of a mobile phone and a port of a low DC voltage power supply in accordance with another embodiment of the present invention.

Referring to FIGS. 10 and 11, there is shown a mobile phone wallet case 310 for carrying a conventional mobile phone case 311 which can retain a mobile phone. The mobile phone wallet case 310 has a right or first side 317 and a left or second side 313. The mobile phone case 311 is conventionally attached to the right side 317 of the mobile phone wallet case 310. The left side 313 of the mobile phone wallet case 310 has a plurality of interior card slots 320 for retaining a plurality of credit cards 304 or etc. thereto and a storage compartment 316 located at a lower portion 323. The storage compartment 316 has a left side slot 338, a bottom slot 340, and a lid 318 for opening and closing the storage compartment 316. The lid 318 is securely attached to a proximal end 368 of the storage compartment 316.

A charging and data communication cable 324 comprises an USB connector 328 at one end, a Lightning connector 332 at the other end, and an upside down "U" shaped bracket 380 mounted and slidably retained the cable 324 within the storage compartment 316. The charging and data communication cable 324 slidable feature allows cable slack length in either direction of the USB connector 328 and the Lightning connector 332. The connectors 328 and 332 are extended from a stored configuration within the storage compartment 316 to a fully extended position outside of the storage compartment 316 through the side slot 338 and the bottom slot 340 respectively and for respectively connecting to a port of a low DC voltage power supply and a port of the mobile device. The cable 324 and its connectors 328 and 332 are moved back in the stored configuration when not in use.

A pair of retaining brackets 348 and 350 are located and mounted within the storage compartment 316 for respectively securing the USB connector 328 and the Lightning connector 332 thereto.

The mobile phone case 311 has a rear camera opening 342 which is configured to allow use of a rear camera and flash on a mobile phone that is installed in the phone cavity of the mobile phone case 311. The mobile phone case 311 may have a ring/silent opening 370, volume control openings 372, and a case screen on/off button 354 which is configured to press on a phone screen on/off button on the mobile phone that is installed within the phone cavity of the phone case 311. The mobile phone case 311 has a charging and communication port opening 352 for accessing the Lightning port of the mobile phone, and speaker openings 344 and 346. The mobile phone wallet case 310 further includes a fastener 382 for closing the right side 317 to the left side 313.

The Lightning connector 332 may be a female micro-B connector or other types of female/receptacle connectors for charging and data communication.

Figure 12:
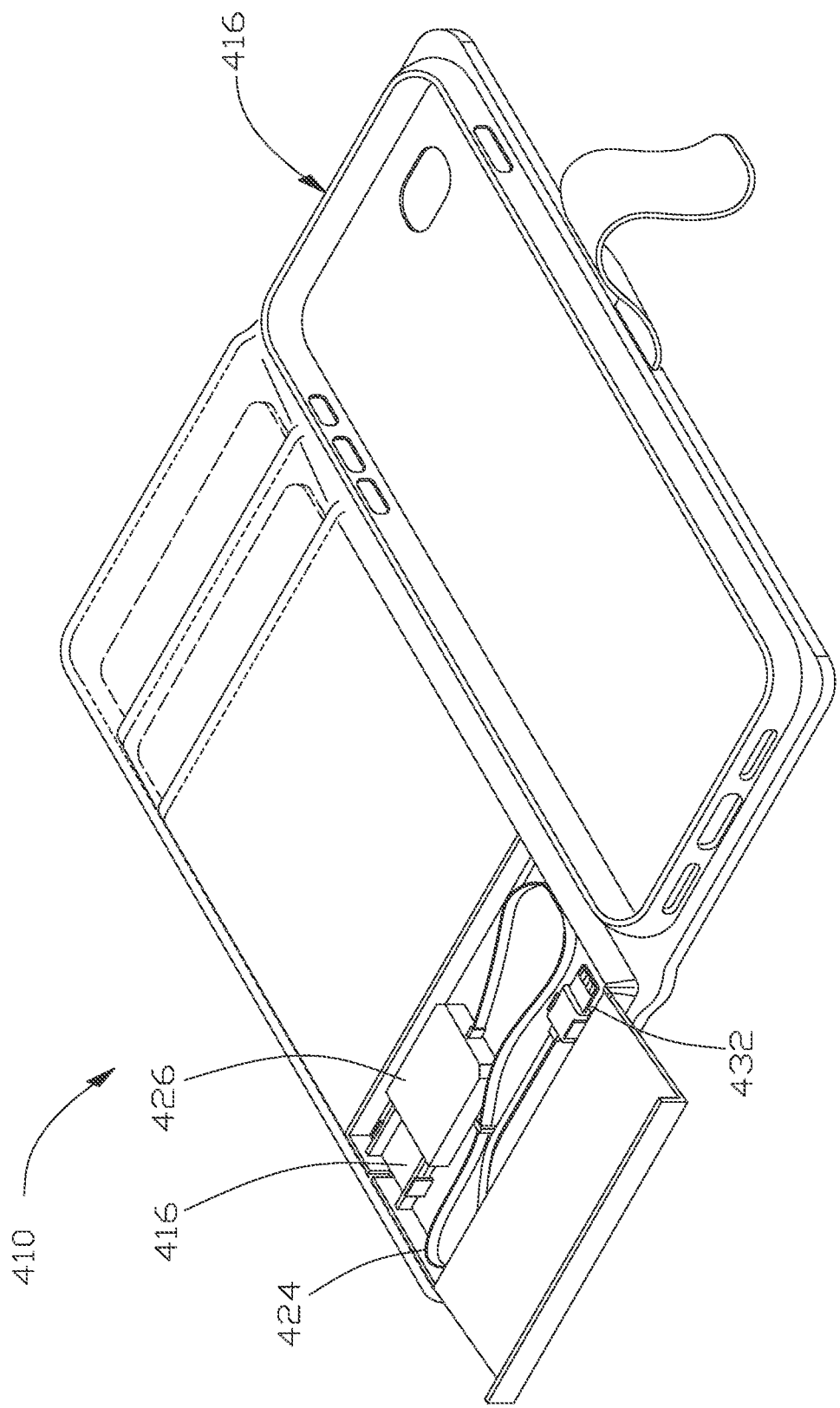
FIG. 12 is a perspective view of a wallet case with a storage compartment and a mobile device case, showing a charging and data communication cable that in one end is connected to a removable AC/DC converter, and on the other end has a connector that can be removed and extended to insert into the port of a mobile phone, while this cable is attached to the body of the case to prevent its inadvertent loss.

Referring to FIG. 12, there is shown a perspective view of a wallet case 410 with a storage compartment 416 and a mobile device case 411. This embodiment is similar to the embodiment shown in FIGS. 10 and 11, wherein a charging and data communication cable 424 includes a removable AC/DC converter 426 at one end, and on the other end has a connector 432 that can be removed and extended to insert into a port of a mobile phone, while the cable is attached to the body of the wallet case 410 to prevent its inadvertent loss.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A mobile phone case for carrying a mobile phone, comprising:
   a. a main body;
   b. a phone cavity located on a front side of said main body, wherein the phone cavity is configured to retain said mobile phone;
   c. a storage compartment located on a rear side of said main body at a lower end and having a side slot, a bottom slot, and a compartment lid for opening and closing the storage compartment;
   d. a charging and communication apparatus mounted within said storage compartment, the apparatus having a circuit board for electrically connecting a USB connector and a lightning connector, a first cable having one end connected to the USB connector and the other end connected to the circuit board, and a second cable having one end connected to the Lightning connector and the other end connected to the circuit board, wherein the USB and the Lightning connectors are configured to extend from a stored configuration within said storage compartment to a fully extended position outside said storage compartment through said side slot and said bottom slot respectively and for respectively connecting to a port of a low DC voltage power supply and a port of said mobile phone and retractable when not in use in the stored configuration; and
   e. a pair of retaining brackets mounted on said circuit board and located within said storage compartment for securing said USB and said Lightning connectors in said stored configuration.

2. The mobile phone case of claim 1 further comprising an integrated card storage compartment located on said rear side of said main body for holding a plurality of credit cards and having an openable lid to allow access to the plurality of credit cards.

3. The mobile phone case of claim 1 further comprising an auxiliary input mounted on said circuit board and electrically connected to said Lightning connector for providing connection to wired headphones for audio from said mobile phone.

4. A mobile phone case for carrying a mobile phone, comprising:
   a. a main body;
   b. a phone cavity located on a front side of said main body, wherein the phone cavity is configured to retain said mobile phone;

c. a storage compartment located on a rear side of said main body and having a first slot, a second slot, and a lid for opening and closing the storage compartment;
d. means for electrically connecting a first connector and a second connector;
e. a first cable having one end connected to said first connector;
f. a second cable having one end connected to said second connector, wherein said first and said second connectors are configured to extend from a stored configuration within said storage compartment to a fully extended position outside said storage compartment for use through said first slot and said second slot respectively and for respectively connecting to a port of a low DC voltage power supply and a port of said mobile phone and retractable when not in use back to the stored configuration; and
g. means for securing said first and said second connectors in said stored configuration in said storage compartment.

5. The mobile phone case of claim 4 further comprising an auxiliary input mounted on said circuit board and electrically connected said second connector for providing connection to wired headphones for audio from said mobile phone.

6. The mobile phone case of claim 4 further comprising an integrated card storage compartment located on said rear side of said main body at an upper location for holding a plurality of credit cards and having an openable lid to allow access to the plurality of credit cards.

7. The mobile phone case of claim 4 wherein said first connector is a USB connector.

8. The mobile phone case of claim 4 wherein said second connector is a Lightning connector.

9. The mobile phone case of claim 4 wherein said second connector is a USB micro-B connector.

10. The mobile phone case of claim 4 wherein said means for securing said first and said second connectors includes a pair of retaining brackets.

11. The mobile phone case of claim 4 wherein said means for electrically connecting includes a circuit board mounted within said storage compartment and electrically connected said first connector and said second connector.

12. A mobile phone case for carrying a mobile phone, comprising
a. a main body;
b. a phone cavity located on a front side of said main body, wherein the phone cavity is configured to retain said mobile phone;
c. a storage compartment located on a rear side of said main body at a lower end and having a side slot and a bottom slot;
d. a charging and data communication apparatus mounted within said storage compartment, the apparatus having a first cable, a second cable, a USB connector, a Lightning connector, and a circuit board for electrically connecting the USB connector and the Lightning connector;
e. a first spring-loaded mechanism for providing linear movement to said first cable, said first cable having one end connected to said USB connector and the other end connected to said circuit board;
f. a second spring-loaded mechanism for providing linear movement to said second cable, said second cable having one end connected to said Lightning connector and the other end connected to said circuit board;
g. a pair of protruding pegs for facilitating the movement of and respectively coupled to said USB connector and said Lightning connector wherein the pair of protruding pegs are configured to extend said USB and Lightning connectors from a stored configuration within said storage compartment to a fully extended position outside said storage compartment for use through said side slot and said bottom slot respectively and for respectively connecting to a port of a low DC voltage power supply and a port of said mobile phone and retractable by said first and second spring-loaded mechanisms when not in use in the stored configuration; and
h. a pair of retaining brackets located within said storage compartment for respectively securing said USB connector and said Lightning connector in said stored configuration within said storage compartment.

13. The mobile phone case of claim 12 further comprising a slot card storage compartment located on said rear side of said main body at an upper location for retaining a plurality of credit cards thereto and having an opposite finger opening to push out the plurality of credit cards from the slot card storage compartment.

14. The mobile phone case of claim 12 further comprising an auxiliary input mounted on said circuit board and electrically connected to said Lightning connector for providing connection to wired headphones for audio from said mobile phone.

15. A mobile phone case for carrying a mobile phone, comprising:
a. a main body;
b. a phone cavity located on a front side of said main body, wherein the phone cavity is configured to retain said mobile phone;
c. a storage compartment located on a rear side of said main body and having a first slot, a second slot, and a lid for opening and closing the storage compartment;
d. means for electrically connecting a first connector and a second connector;
e. a first mechanism for providing linear movement to a first cable having one end connector to said first connector;
f. a second mechanism for providing linear movement to a second cable having one end connector to said second connector;
g. means for facilitating the movement of and respectively coupled to said first connector and said second connector wherein the facilitating means are configured to extend said first and second connectors from a stored configuration within said storage compartment to a fully extended position outside of said storage compartment for use through said first slot and said second slot respectively and for respectively connecting to a port of a low DC voltage power supply and a port of said mobile phone and retractable by said first and second mechanisms for providing linear movement when not in use in the stored configuration; and
h. means for securing said first and said second connectors in said stored configuration in said storage compartment.

16. The mobile phone case of claim 15 further comprising an auxiliary input mounted on said circuit board and electrically connected said second connector for providing connection to wired headphones for audio from said mobile phone.

17. The mobile phone case of claim 15 further comprising an integrated card storage compartment located on said rear side of said main body at an upper location for retaining a plurality of credit cards.

18. The mobile phone case of claim 15 wherein said first connector is a USB connector.

19. The mobile phone case of claim 15 wherein said second connector is a Lightning connector.

20. The mobile phone case of claim 15 wherein said second connector is a USB micro-B connector.

21. The mobile phone case of claim 15 wherein said means for facilitating the movement of said first and second connectors includes a pair of protruding pegs.

22. The mobile phone case of claim 15 wherein said means for securing said first and said second connectors includes a pair of retaining brackets.

23. A mobile phone wallet case for carrying a mobile phone case which retains a mobile phone, comprising:
   a. a first side having means for retaining said mobile phone case thereto;
   b. a second side having at least one interior card slot for retaining a card thereto and a storage compartment located at a lower end and having a first slot, a second slot, and a lid for opening and closing the storage compartment;
   c. a charging and data communication cable having a first connector at one end, a second connector at the other end, and a bracket for slidably retaining the cable within said storage compartment to allow slack in either direction of the first connector and the second connector, wherein the first and the second connectors are configured to extend from a stored configuration within said storage compartment to a fully extended position outside said storage compartment for use through said first and second slots respectively and for respectively connecting to a port of a low DC voltage power supply and a port of said mobile phone and retractable when not in use in the stored configuration; and
   d. means for securing said first and said second connectors in said stored configuration in said storage compartment.

24. The mobile phone wallet case of claim 23 wherein said first connector is a USB connector.

25. The mobile phone wallet case of claim 23 wherein said second connector is a Lightning connector.

26. The mobile phone wallet case of claim 23 wherein said second connector is a USB micro-B connector.

27. The mobile phone wallet case of claim 23 wherein said means for securing said first and said second connectors includes a pair of retaining brackets.

* * * * *